United States Patent [19]
Horiuchi et al.

[11] Patent Number: 5,886,475
[45] Date of Patent: Mar. 23, 1999

[54] EL ELEMENT DRIVING CIRCUIT AND EL ELEMENT LIGHTING DEVICE USING THE SAME

[75] Inventors: Sachito Horiuchi; Hiroyuki Ishikawa, both of Kyoto, Japan

[73] Assignee: Rohm Co., Ltd., Kyoto, Japan

[21] Appl. No.: 768,463

[22] Filed: Dec. 18, 1996

[30] Foreign Application Priority Data

Dec. 26, 1995 [JP] Japan .................................. 7-351365

[51] Int. Cl.$^6$ .................................................. H05B 37/02
[52] U.S. Cl. .......................... 315/169.3; 345/76; 345/77; 345/212
[58] Field of Search .......................... 315/169.3; 345/76, 345/77, 102, 212

[56] References Cited

U.S. PATENT DOCUMENTS 5,502,357 3/1996 Kimball ............................. 315/209 R
5,519,288 5/1996 Tatsumi et al. ....................... 315/169.3

FOREIGN PATENT DOCUMENTS 7-65952 3/1995 Japan .

*Primary Examiner*—Arnold Kinkead
*Attorney, Agent, or Firm*—Fay, Sharpe, Beall, Fagan, Minnich & McKee

[57] ABSTRACT

In an EL element driving circuit, a fly back pulse generating circuit receives an electric power from a DC power source through a coil and generates fly back pulses by a switching circuit. The electric power of the fly back pulses is supplied to the EL element as a charging electric power and a current which flows from the DC power source to the coil by the switching operation of the switching circuit is controlled by an adjusting circuit which adjusts the ON period of the switching circuit within a period substantially corresponding to a period after the switching circuit is turned ON and until the current maximizes.

2 Claims, 3 Drawing Sheets

EL ELEMENT DRIVING CIRCUIT AND EL ELEMENT LIGHTING DEVICE USING THE SAME

BACKGROUND OF THE INVENTION (1) Field of the Invention

The present invention relates to an EL element driving circuit and an EL element lighting device using the same, and, more specifically, relates to an EL element driving circuit in a lighting device using EL elements (EL element lighting device) in which the brightness of EL elements can be adjusted product by product. Thereby the variation in their illumination intensities of the products can be suppressed and the power consumption thereof can be reduced. The EL element lighting devices are, for example, utilized for lighting devices in portable electronic apparatus such as wrist watches and PHSs, lighting devices in other battery driven electronic apparatus as well as backlights in liquid crystal display devices such as for portable terminal devices and battery driven electronic apparatus.

(2) Background Art

Until now some products of the lighting devices for battery driven electronic devices such as wrist watches and portable electronic apparatus have used the EL elements. EL elements consume less electric power than ultra small sized incandescent lamps and semiconductor light emitting elements and are suitable for small sized and thinned devices, therefor the EL elements have been used for such products.

EL elements are ones which make use of the so called electro luminescence phenomenon, and among these EL elements a dispersed type EL panel in which a fluorescent substance used for EL is dispersed in a dielectric substance is structured into a capacitor form. In this form, a light emitting substance formed by dispersing a fluorescent material into a dielectric material is sandwiched between two pieces of electrodes. Such an EL panel is generally driven by a driving circuit which generates pseudo AC waves.

Namely, although these types of EL elements can not inherently be lighted by a DC signal, through repetition of driving by pulses and discharging electric charges charged for the EL element, an EL element in the form of a capacitor can be driven in a same manner as in an AC drive, which is indicated above as a pseudo AC drive.

FIG. 3 is an example of these types of EL element driving circuits.

Numeral 1 is a battery, numeral 2 is an EL element driving circuit and numeral 3 is an EL element (EL panel).

The EL element driving circuit 2 is constituted by a high voltage pulse generating circuit 21, a discharge circuit 22 and a control circuit 23. The high voltage pulse generating circuit 21 is a so called boosting circuit and is constituted by a transformer 24, a switching transistor 25, a diode 26 and an oscillator circuit 27 which receives signals from the secondary coil of the transformer 24 and performs a blocking oscillation.

The EL element driving circuit 2 receives an electric power supply from the battery 1 via the transformer 24, generates as an output of the transformer 24 high voltage pulses which are generated by switching (ON/OFF) an NPN type transistor (TR1) 25 inserted between the output side of the transformer 24 and the ground GND. And, driving circuit 2 charges and drives the EL panel 3 by applying the output to the EL panel 3 via a forward directed diode 26. Further, the EL panel 3, of which one electrode is connected to the side of the diode 26 and of which another electrode is connected to the ground GND, thus receives high voltage electric power. The discharge circuit 22 is constituted by an NPN type transistor (TR2) 28 connected between the EL panel 3 at the side where the diode 26 is connected and the ground GND and causes to discharge the electric charges in the EL panel 3 in a period other than the charging period.

The control circuit 23 drives the oscillation circuit 27 for a certain predetermined period and causes the transistor 25 by control signal A to perform a switching operation (ON/OFF) of a predetermined frequency, for example, several 10 kHz for a certain predetermined period to thereby generate an electric power of boosted high voltage. Thereafter, the control circuit 23 generate a control signal B and turns ON the transistor 28 to thereby discharge the electric charge in the EL panel 3. Namely, the control circuit 23 generates alternatively the control signal A and the control signal B at a certain cycle. Thereby, the timings of the charging period (a fly back pulse generation period) and the discharging period for the EL element are varied.

However, with such an EL element driving circuit, a variation in brightness of the EL elements is likely to occur product by product for the reason that the characteristic variation of respective elements directly affects onto the variation of their charging voltages. Therefore, it was determined to be necessary to insert a resistor circuit used for detecting the charging voltage at the output side as a load and to adjust the brightness as, for example, disclosed in JP-A-76-5952(1995). With such a measure the variation in brightness can be adjusted, however, with the provision of such a detection circuit, a power loss is correspondingly induced and the advantage of low power consumption for the lighting devices using EL elements is correspondingly reduced.

SUMMARY OF THE INVENTION

An object of the present invention is to solve the above mentioned conventional problems and to provide an EL element driving circuit which limits the power consumption and permits brightness adjustment on a product by product basis.

Another object of the present invention is to provide an EL element lighting device which limits the power consumption and permits brightness adjustment on product by product basis.

An EL element driving circuit and an EL element lighting device using the same according to the present invention which achieves the above objects is characterized in that, the EL element driving circuit and the EL element lighting device using the same comprises a DC power source; a fly back pulse generating circuit which includes a coil and a switching circuit, receives electric power from the DC power source via the coil and generates fly back pulses at the output side of the coil through switching of the switching circuit; a rectifying circuit which receives the electric power from the fly back pulse generating circuit and causes a charging current to flow for an EL element; a discharging circuit which discharges the electric charges in the EL element; a control circuit which causes the switching circuit to perform a plurality of times of switching in a switching operation for a predetermined cycle and activates the discharging circuit in a period in which the plurality of times of switching are not performed; and an adjusting circuit which adjusts the ON period of the switching circuit within a period after the switching circuit is turned ON and until the current flowing through the coil is maximized.

As will be understood from the above, at first in the fly back pulse generating circuit an electric power is received by the coil and the fly back pulses are generated by the switching circuit. The electric power of the fly back pulses is supplied to the EL element as the charging electric power. Further, the current flowing from the DC power source to the coil through the switching operation of the switching circuit is controlled by the adjusting circuit which adjusts the ON period of the switching circuit within a period which is substantially equal to the period after the switching circuit is turned ON and until the current is maximized.

In this instance, when the ON period of the switching circuit is adjusted to be short, the voltage (boosted voltage) by a fly back pulse for the ON period of one time is reduced. Because the EL element is a capacitor, the level of a final boosted voltage which is determined by a plurality of fly back pulses generated by the plurality of switching operations can be adjusted to be low. Thereby, the brightness of the EL element can be adjusted.

As will be understood from the above explanation, according to the present invention, the brightness adjustment of the EL element can be achieved only by adjusting the switching period of the switching circuit and the conventional provision of the brightness adjusting circuit, which requires insertion of a detection circuit such as a resistor operating as a parallel resistor with regard to the EL element, is eliminated. Accordingly, the power consumption of the circuit according to the present invention is limited low.

As a result, the brightness variations between products such as EL element lighting devices is eliminated and the power consumption thereby is limited to a minimum requirement.

DESCRIPTION OF THE PREFERRED EMBODIMENT

Figure 1:
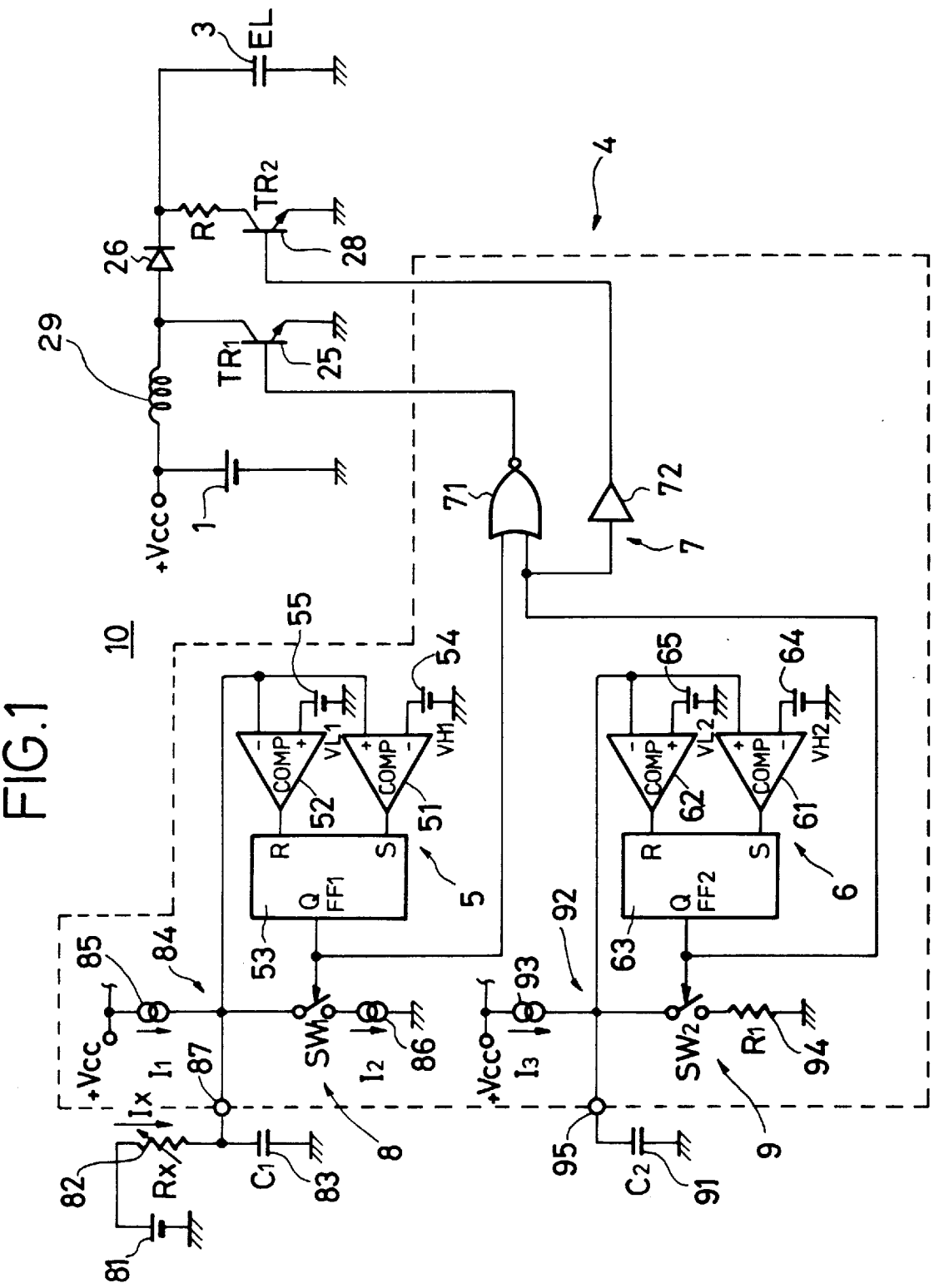
FIG. 1 is a block diagram of one embodiment in which an EL element driving circuit according to the present invention is applied.
Figure 3:
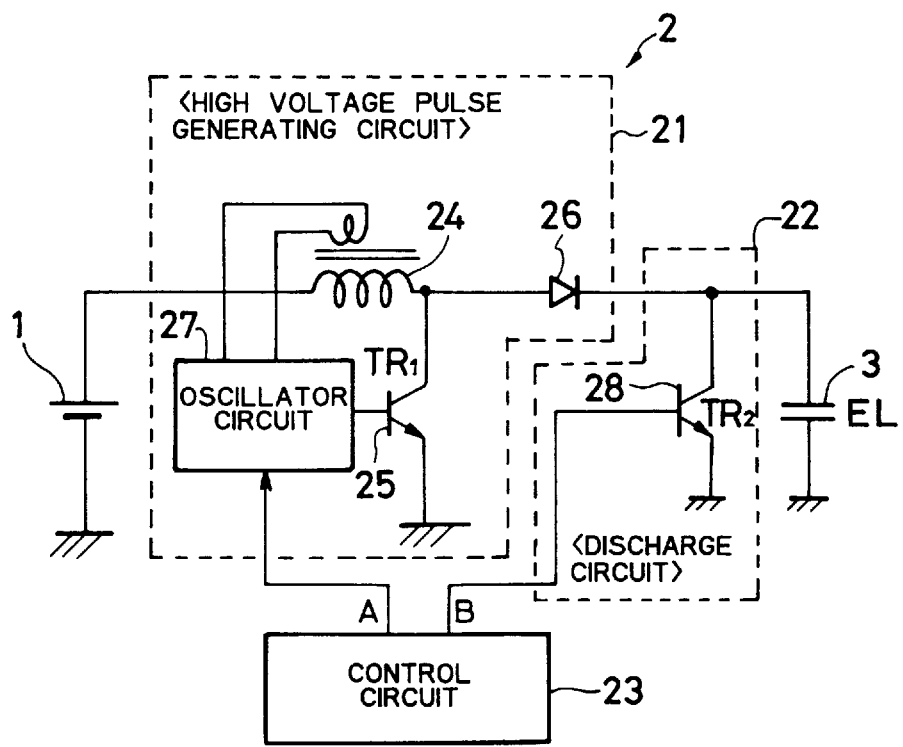
FIG. 3 is a block diagram of a conventional EL element driving circuit.

In FIG. 1, numeral 10 is an EL element driving circuit which is driven by a single battery. Numeral 4 is a control circuit therefor and is constituted by a driving side oscillation circuit 5, a discharging side oscillation circuit 6 and an output circuit 7. Numeral 8 is a triangular wave generating circuit in the driving side oscillation circuit 5 and numeral 9 is a triangular wave generating circuit in the discharging side oscillation circuit 6. The same and equivalent elements in FIG. 1 as in FIG. 3 are designated by the same reference numerals.

The portion in the control circuit 4 surrounded by a dotted frame is a circuit portion which is formed into one chip IC, on the other hand, such as a variable resistor (Rx) 82, capacitors (C1) 83 and (C2) 91 which constitute parts of the triangular wave generating circuits 8 and 9 are parts which are externally attached to the above formed one chip IC. Further, a coil 29 in the EL element driving circuit 10 is provided in place of the transformer 24 in FIG. 3 and R is a resistor provided in the discharging circuit and for determining the discharging time constant of the circuit.

In the present embodiment, through the switching of the transistor (TR1) 25, which is inserted as a shunt load with respect to the coil 29, the fly back pulses are generated and the voltage boosting is effected. Then, the EL panel 3 is charged and driven by the electric power of the boosted voltage. Further, through turning ON of the transistor (TR2) 28 provided in parallel with the EL panel 3 the electric charges in the EL panel 3 are discharged. Thereby, the pseudo AC drive of the EL element 3 is effected.

The driving side oscillation circuit 5 (hereinbelow called a pulse oscillation circuit 5) in the control circuit 4 is provided for switching the transistor (TR1) 25 with a predetermined adjusted pulse width. Further, the discharging side oscillation circuit 6 (hereinbelow called as a pulse oscillation circuit 6) in the control circuit 4 is provided for switching the transistor (TR2) 28 and generates pulses having a lower frequency as generated from the pulse oscillation circuit 5. The output circuit 7 in the control circuit 4 is a logic circuit which performs a control to receive respective output pulses from the pulse oscillation circuit 5 and the pulse oscillation circuit 6, to suppress the output from the pulse oscillation circuit 5 during the pulse generation period of the pulse oscillation circuit 6 and to terminate the switching operation of the transistor (TR1) 25.

As a result, the operation of the pulse oscillation circuit 5 causing the switching (ON/OFF) of the transistor (TR1) 25 is performed only during the period when no pulses are generated from the pulse oscillation circuit 6. During a period when pulses are generated from the pulse oscillation circuit 6 discharging of the EL element 3 is performed. In this way overlapping of the charging period and the discharging period for the EL element 3 is prevented.

Further, in order to permit adjustment of the ON period (the ON period of the switching circuit) of the transistor (TR1) 25 the triangular wave generating circuit 8 is provided with a power source and a variable resistor 82 of which resistance value can be adjustable from the outside. The variable resistor 82 adjusts charging and discharging current wave forms of a capacitor 83 through transmission of charging current to the capacitor 83 (detail of which will be explained later). Thereby, the width of the output pulses from the pulse oscillation circuit 5 is adjusted. Further, the maximum width of the output pulses adjusted at this instance is substantially equal to the period after the transistor 25 is turned ON and until the current flowing through the coil 29 is maximized.

The pulse oscillation circuit 5 is constituted by a triangular wave generating circuit 84, comparators (COMP) 51 and 52 and a flip-flop circuit (FF1) 53, and the pulse oscillation circuit 6 is constituted by a triangular wave generating circuit 92, comparators (COMP) 61 and 62 and a flip-flop circuit (FF2) 63. The frequencies of the triangular waves of the respective triangular wave generating circuits 84 and 92 correspond to the oscillation frequencies of the respective pulse oscillation circuits 5 and 6.

Figure 2:
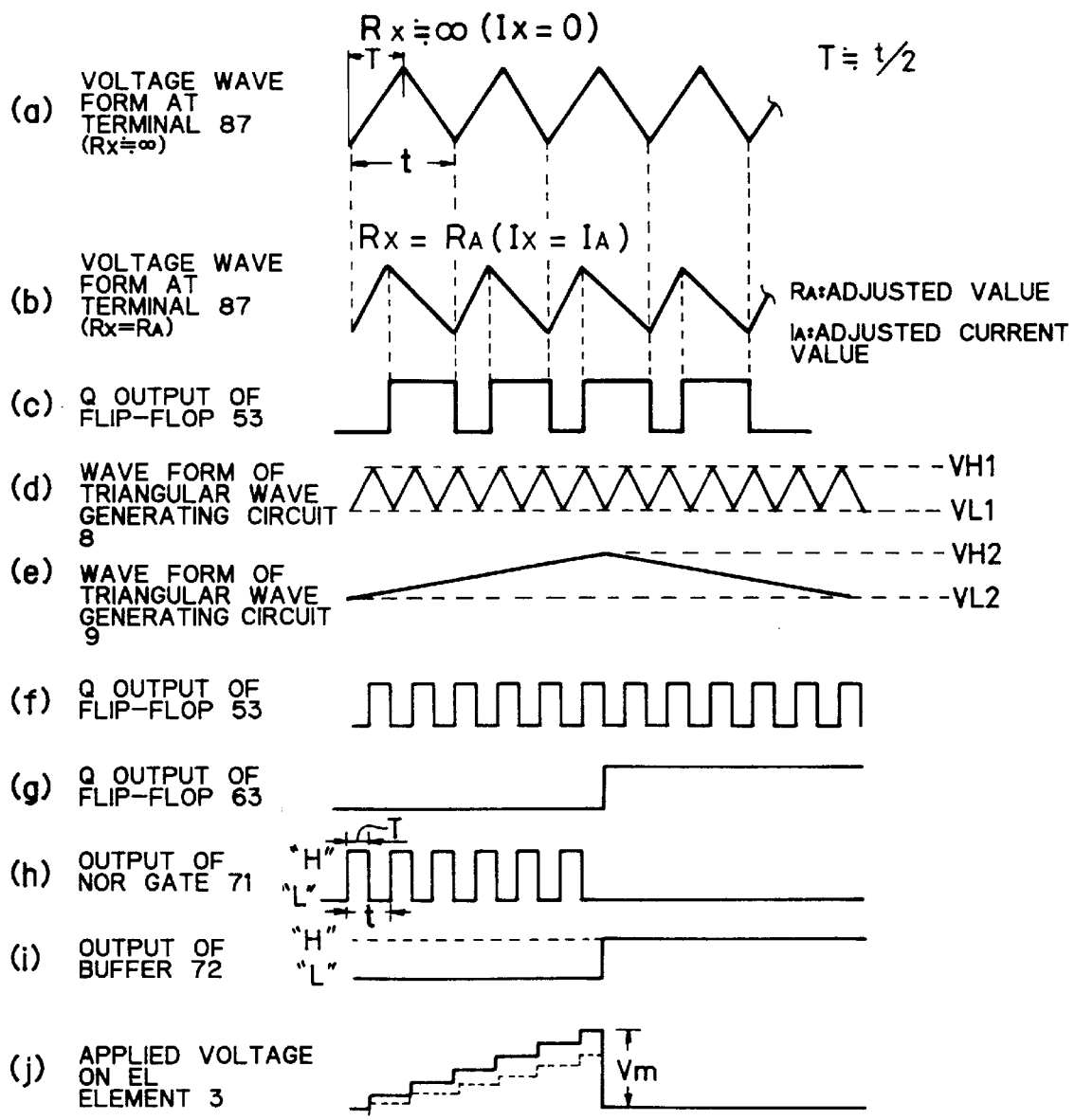
FIGS. 2(a)–2(j) are waveform diagrams for explaining the operation of the embodiment.

The respective triangular wave generating circuits 84 and 92 include the respective capacitors 83 and 91 and the respective oscillation frequencies are determined through charging and discharging of these capacitors 83 and 91. For this purpose, the triangular wave generating circuit 84 is provided with constant current circuits 85 and 86 used for charging and discharging, and the triangular wave generating circuit 92 is provided with constant current circuits 93 and 94 used for charging and discharging. Through charging and discharging with a constant current charging and discharging, wave forms of triangular waves having straight line slopes as illustrated in FIGS. 2 (a) and (b) are formed. The output pulses of the pulse oscillation circuits 5 and 6 are respectively taken out from the Q outputs of the flip-flop circuits 53 and 63.

Now, the structure and operation of the charging side circuit for the EL panel 3 is explained. The comparator 51 in the pulse oscillation circuit 5 constituting the charging side driving circuit includes a power source having a reference voltage VH1 as the reference side input voltage thereof. The signal input side of the comparators 51 receives the output of the triangular wave generating circuit 8 (a voltage signal of the triangular wave at terminal 87) as an input signal. The comparator 52 receives the output of the triangular wave generating circuit 8 as the reference side input voltage thereof, and the signal input side of the comparator 52 receives a reference voltage VL1 from a power source 55. In the present embodiment, the magnitudes of the two reference voltages are set in the relationship of VL1<VH1.

The comparator 51 generates a detection pulse at the timing when the voltage level of the input triangular wave exceeds the reference voltage VH1 and inputs the detection pulse output to the set side (S) of the flip-flop circuit 53. Thereby, the flip-flop circuit 53 is set at "1" and generates an output at the Q output and discharging of the capacitor 83 is started via the switch SW1 turned ON. Further, the comparator 52 generates a detection pulse at the timing when the voltage level of the input triangular wave drops below the reference voltage VL1 and inputs the detection pulse output to the reset side (R) of the flip-flop circuit 53. Thereby, the flip-flop circuit 53 is set at "0" and terminates the output at the Q output and the charging of the capacitor 83 is started via the switch SW1 being turned OFF.

As a result, a pulse (see FIG. 2(c)), of which the width is determined based on the charging and discharging time constant of the triangular wave from the triangular wave generating circuit 8 and the reference voltages VL1 and VH1, is generated as the Q output of the flip-flop circuit 53. The Q output is transmitted to the output circuit 7 as well as serves as a signal which turns ON a switch SW1 in the triangular wave generating circuit 8. When the switch SW1 is turned ON, the discharging of the capacitor 83 is initiated through the constant current source 83.

In the present embodiment the triangular wave generating circuit 8 includes a pulse width adjusting circuit constituted by the power source 81 and the variable resistor 82 of which the resistance value Rx is variable, a capacitor 83 having a capacitance of C1 and a charging and discharging circuit 84 for the capacitor 83. The triangular wave generating circuit 8 takes out its output signal voltage from the terminal 87 of the capacitor (at the junction point of the variable resistor 82 and the capacitor 83) and transmits the same to the comparators 51 and 52. Herein the variable resistor 82 and the capacitor 83 constitute a series circuit and are connected between the positive terminal of the power source 81 and the ground GND, and which circuit supplies a charging current for the capacitor 83 depending on the resistance value of the variable resistor 82 and adjusts the charging and discharging current with the resistance value Rx of the variable resistor 82.

The charging and discharging circuit 84 is constituted by a series circuit of the constant current source 85 having a current value of I1, the switch SW1 and the constant current source 86 having a current value of I2 inserted between the power source line Vcc and the ground GND. The junction point of the constant current source 85 and the switch SW1 is connected to the charging and discharging terminal (the terminal 87) of the capacitor 83. The switch SW1 is turned ON when the Q output of the flip-flop circuit 53 is generated and is turned OFF when the Q output of the flip-flop circuit 53 is terminated. Thereby, when the switch SW1 is in the OFF condition, the charging to the capacitor 83 is performed. In this instance, the capacitor 83 is charged by the electric power from the power source 1 and the power source line Vcc via the variable resistor 82 and the constant current source 85. When the switch SW1 is in the ON condition, discharging of the capacitor 83 is performed. At this instance the junction point of the constant current source 85 and the switch SW1 becomes equivalent to the junction point of the constant current source 85 and the constant current source 86. Accordingly, the charging current supplied from the variable resistor 82 flows through the constant current source 86 as it is and at the same time the electric charges in the capacitor 83 are discharged via the constant current source 86. As a result, the charging and discharging time of the capacitor 83 is varied depending on the resistance value Rx of the variable resistor 82. Further, such charging and discharging time can also be set from the outside. Moreover, the current value I2 of the constant current source 86 is set to be larger than the sum of the charging current value of the constant current circuit 85 for the capacitor 83 and the maximum charging current value applied via the variable resistor 82.

Now, the width adjustment of the output pulses from the pulse oscillation circuit 5 is explained while assuming that the current value I2 of the constant current source 86 is about two times of the current value I1 of the constant current source 85.

When the resistance value Rx of the variable resistor 82 is nearly ∞, such a charging and discharging characteristic for the EL panel 3 is shown as the current during charging of the capacitor 83 which is I1 and the current during discharging thereof is I1 (=2I1−I1). As a result, the voltage wave form at the terminal 87 representing the output of the triangular wave generating circuit 8 assumes a symmetrical triangular wave form as illustrated in FIG. 2(a). When the resistance value Rx is adjusted from the outside and current Ix=IA flows through the variable resistor 82, the current during charging of the capacitor 83 amounts I1+IA, and since the current of the constant current source 85 is 2I1, the current during discharging of the capacitor 83 amounts to 2I1−(I1+IA). As a result, a non-symmetrical triangular wave form, of which the slope at the discharging side is gentle and varies depending on the current value IA as illustrated in FIG. 2(b), is generated.

As a result, within the range of IA<I1 the charging time can be adjusted in a range of 0~t/2 and attains the maximum at to a cycle of t/2. In the present embodiment, the period after the transistor 25 (a switching circuit) is turned ON and until the current flowing through the coil 29 maximizes corresponds to t/2.

On the other hand, the oscillation frequency and wave form of the pulses from the pulse oscillation circuit 5 are determined by the reference voltages VL1 and VH1, current values I1, I2 and the capacitance C1 of the capacitor 83. The pulses from the flip-flop circuit 53 in the pulse oscillation circuit 5, for example, are generated as illustrated in FIG. 2(c) at the timing when the slope for the discharging side is initiated which corresponds to the latter half of the triangular wave form as illustrated in FIG. 2(b), and are terminated at the timing when the slope ceases. In this instance, the ON period of the transistor 25 is alloted to the period of LOW level (hereinbelow simply indicated as "L") of the pulses as the Q output of the flip-flop 53 illustrated in FIG. 2(c) which will be explained later.

The structure of the discharging side for the EL panel 3 which is substantially the same as the charging side circuit is briefly explained hereinbelow. Comparators 61 and 62 in the pulse oscillation circuit 6 respectively correspond to the comparators 51 and 52 in the pulse oscillation circuit 5, and the flip-flop circuit 63 corresponds to the flip-flop 53 in the pulse oscillation circuit 5. Further, a power source 64 which applies a reference voltage VH2 to the reference input side of the comparator 61 corresponds to the power source 56 except for the voltage value thereof and a power source 65 which applies a reference voltage VL2 to the signal input side of the comparator 62 corresponds to the power source 55 except for the voltage value thereof. Further, the pulse oscillation circuit 6 receives respectively at the comparators 61 and 62 triangular wave voltage signals from a triangular wave generating circuit 9 which corresponds to the triangular wave generating circuit 8 in the pulse oscillation circuit 8.

The triangular wave generating circuit 9 is constituted by a capacitor 91 having capacitance C2 and a charging and discharging circuit 92 for the capacitor 91, and generates output voltage signals at a terminal 95 of the capacitor 91.

The charging and discharging circuit 92 is constituted by a series circuit of a constant current source 93 having current value I3, a switch SW2 and a resistor 94 having resistance value R1 inserted between the power source line Vcc and the ground GND, and the junction point of the constant current source 93 and the switch SW2 is connected to the charging and discharging terminal (the terminal 95) of the capacitor 91. The switch SW2 is turned ON when the Q output of the flip-flop circuit 63 is generated, and is turned OFF when the Q output is terminated.

As a result, under the OFF condition of the switch SW2, the capacitor 91 is charged by the electric power from the power source line Vcc via the constant current source 93. Under the ON condition of the switch SW2 the capacitor 91 is discharged via the resistor 94. The charging time constant of the triangular wave generating circuit 9 is non-variable and the triangular wave generating circuit 9 generates outputs of symmetrical triangular wave form as illustrated in FIG. 2(e). Further, in order to clarify the relationship between the wave form generated by the triangular wave generating circuit 8 as illustrated in FIG. 2(d) and the wave form generated by the triangular wave generating circuit 9 as illustrated in FIG. 2(e), the scales of time and magnitude for the wave forms as illustrated in FIGS. 2(d) and (e) are reduced in comparison with those in FIGS. 2(a) and (b).

Accordingly, the particular connecting relation and operation of the pulse oscillation circuit 6 are similar to those of the pulse oscillation circuit 5 except for the omission of the pulse width adjusting circuit constituted by the power source 81 and the variable resistor 82, and except for and the lower oscillation frequency than that of the pulse oscillation circuit 5 (see FIGS. 2 (d) and (g)). Therefore, the detailed explanation of the connecting relation and the operation of the pulse oscillation circuit 6 is omitted.

The capacitor C2 of the capacitor 91 in the triangular wave generating circuit 9 is set to be larger than the capacitance C1 of the capacitor 83 and the current value I3 of the constant current source 93 is set smaller than the current values I1 and I2. Accordingly, the cycle of the triangular wave from the triangular wave generating circuit 9 is longer than that of the triangular wave generated from the triangular wave generating circuit 8 and thus the oscillation frequency of the pulses from the pulse oscillating circuit 6 is determined by the reference voltages VL2 and VH2, the capacitance C2 of the capacitor 91, current value I3 and the resistance R1 of the resistor 94 and is lower than that from the pulse oscillation circuit 5.

The output circuit 7 is constituted by a two input NOR gate 71 and a buffer circuit 72 and one of the inputs of the NOR gate 71 receives the Q output of the flip-flop circuit 53 and the other input thereof receives the Q output of the flip-flop circuit 63.

When assuming that the Q output of the flip-flop circuit 53 is one as shown in FIG. 2(f) and the Q output of the flip-flop circuit 63 is one as shown in FIG. 2(g), the NOR gate 71 outputs pulses having a pulse width which corresponds to the period when both Q outputs are in "L" condition as shown in FIG. 2(h). The output of the NOR gate 71 is applied to the base of the transistor 25 to turn ON/OFF the same.

The period of HIGH level (hereinbelow simply indicated as "HI") output of the NOR gate 71 corresponds to the charging side period of the triangular waves as shown in FIGS. 2(a) and (b). Accordingly, the ON period of the transistor 25 can be selected by the resistance value of the variable resistor 82 and the maximum period T thereof substantially corresponds to $t/2(T \approx t/2)$ with respect to the cycle t of the triangular waves generated from the triangular wave generating circuit 8. Moreover, the ON period can be set equal to or smaller in width than the period T depending on the resistance value of the variable resistor 82.

When causing a current flow through the coil 29 by turning ON the switching transistor 25, the current gradually increases from the beginning of the current flow because of the inductance of the coil 29 and reaches a predetermined current value after a predetermined time has passed. When a capacitor (the EL panel 3) is connected at the output side of the coil 29, the current gradually increases and thereafter decreases depending on the time constant determined by the inductance of the coil 29 and the capacitance of the capacitor.

Since the EL panel 3 is a capacitor, therefore, in the present embodiment a capacitor in the form of the EL panel is connected to the coil 29. Accordingly, the current from the battery 1 flows in response to the ON/OFF switching of the transistor 25, gradually increases from the moment of turning ON, reaches the maximum value and thereafter decreases depending on the charging condition of the EL panel 3.

Therefore, the period after initiating the current flow through the coil 29 and until the current maximizes (energy accumulating period), or the period close thereto, is determined as the maximum ON period T of the transistor 25, and the ON period of the transistor 25 is adapted to be adjustable by the variable resistor 82 within the range equal to or less than the maximum ON period T.

Namely, through adjustment of the resistance value of the variable resistor 82 the period of the driving pulse width for the transistor 25 (ON period of the transistor 25) is varied in the range of 0~T, thereby, the amount of the accumulating current which flows through the coil 29 is adjusted in the range of a very small value to the maximum value T. As a result, the level of a fly back voltage which is caused when the transistor 25 is turned OFF can be adjusted from a lower value up to the maximum voltage value.

Further, since the voltage application to the EL panel 3 is performed in the same manner as performed for a capacitor having a predetermined capacitance, the voltage applied to the EL panel 3 increases in a step manner by fly back pulses which are generated every time when the transistor 25 is turned ON as illustrated in FIG. 2 (j) and the final voltage value is determined depending on the fly back voltage. The final voltage value (the maximum value) Vm is equal to or less than the fly back voltage which is determined by the number of turning ONs of the transistor 25 and a fly back pulse voltage generated at one time. Moreover, the fly back pulse voltage is determined by the current energy accumulated in the coil 29. Further, the number of the turning ONs of the transistor 25 depends on the difference between the frequencies of the pulse oscillation circuit 5 and the pulse oscillation circuit 6 and the pulse width (or the rest period of the pulse) of the pulse oscillation circuit 6.

As a result, through adjustment of the variable resistor 82 the level of the final voltage is varied as shown by the dotted line in FIG. 2(*j*). On the other hand, when the EL panel 3 is driven by a pseudo AC drive in which the charging and discharging are performed through such a pulse drive, the brightness of the EL panel 3 is determined by the voltage of the pulse drive, therefore, the brightness adjustment of the EL panel 3 can be performed by adjusting the fly back voltage depending on the resistance value of the variable resistor 82.

Finally, the operation at the discharge side circuit is explained. The Q output of the flip-flop circuit 63 is shown in FIG. 2(*g*). In the range "H" of the Q output the transistor 25 is not driven as shown in FIG. 2(*h*). Therefore, the Q output of the flip-flop circuit 63 is applied to the base of the transistor 28 via the buffer circuit 72 (see FIG. 2(*i*)) and during this time the transistor 28 is turned ON.

Namely, by means of "H" output of the buffer circuit 72, the transistor 28 is driven and is turned ON, and during the period "H" when the transistor 25 is in a non-operative condition, the electric charge charged in the EL panel 3 are discharged through the transistor 28. This operation is repeated with the cycle of the pulse oscillation circuit 6 at the discharging side.

As an alternative of the above explained embodiment, the switching operation of the transistor TR1 can be effected during the period when the pulse oscillation circuit 6 is generating pulses and during the period when the pulse oscillation circuit 6 is generating no pulses, the discharging of the EL element can be effected. Such control can be realized simply, for example, by inserting an inverter at the downstream of the Q output of the flip-flop circuit 63.

We claim:

1. An EL element driving circuit, comprising:

a DC power source;

a fly back pulse generating circuit which includes a coil and a switching circuit, receives electric power from said DC power source via said coil and generates fly back pulses at the output side of said coil through switching of said switching circuit;

a rectifying circuit which receives the electric power from said fly back pulse generating circuit and causes a charging current to flow into an EL element;

a discharging circuit which discharges the electric charge in the EL element;

a control circuit which causes said switching circuit to perform a plurality of times of switching in a switching operation for a predetermined cycle and activates said discharging circuit in a period in which the plurality of times of switching are not performed; and an adjusting circuit which adjusts the ON period of said switching circuit within a period after said switching circuit is turned ON and until the current flowing through said coil is maximized;

wherein said DC power source is a battery, the EL element is a dispersed type EL panel formed by dispersing a fluorescent substance used for EL in a dielectric substance and said switching circuit has a first transistor disposed between the output side of said coil and a grounding line;

wherein said discharging circuit has a second transistor disposed between a terminal at the charging side of the EL element and the ground line, said control circuit includes a first pulse oscillation circuit which generates first pulse signals as control signals for switching said switching circuit and a second pulse oscillation circuit which generates second pulse signals having the predetermined cycle as control signals for operating said discharging circuit, the second pulse signals are for turning ON said second transistor and have a lower frequency than that of the first pulse signals, said control circuit performs the plurality of times of switching of said first transistor in response to the first pulse signals when no second pulse signals are output, and said adjusting circuit is a circuit which adjusts the pulse width of the first pulse signals; and wherein said rectifying circuit has a diode and each of said first and second pulse oscillation circuits has a triangular wave generating circuit, a flip-flop circuit, a first comparator which compares the voltage of output signals from said triangular wave generating circuit with a first reference voltage and of which an output is connected to a set terminal of said flip-flop circuit and a second comparator which compares the voltage of the output signals from said triangular wave generating circuit with a second reference voltage and of which an output is connected to a reset terminal of said flip-flop circuit, and the output of the pulse oscillation circuit is generated by an output of the flip-flop circuit.

2. An EL element driving circuit according to claim 1, wherein said triangular wave generating circuit in said first pulse oscillation circuit includes a capacitor, a first constant current circuit which transmits a charging current to said capacitor, and a second constant current circuit which is connected to a terminal at the charging side of said capacitor via a switch circuit and is for discharging electric charges in said capacitor, and said switch circuit is turned ON in response to the output from said flip-flop circuit, said adjusting circuit has a variable resistor of which a resistance value is adjustable from the outside and a power source and a current from said power source is supplied to said capacitor via said variable resistor, and the current value of said second constant current circuit is larger than the sum of the charging current of said first constant current circuit and a maximum charging current supplied via said variable resistor.

* * * * *